(12) United States Patent
Schade et al.

(10) Patent No.: US 11,628,433 B2
(45) Date of Patent: Apr. 18, 2023

(54) METERING DEVICE

(71) Applicant: Bayer Pharma Aktiengesellschaft, Berlin (DE)

(72) Inventors: Andreas Schade, Essen (DE); Mike Küster, Düsseldorf (DE); Klaus Ochmann, Leverkusen (DE); Michael Harnau, Leichlingen (DE); Karl-Hermann Koeching, Dormagen (DE); Nils Burkhardt, Velbert (DE); Bernd Kalthof, Wuppertal (DE); Linn Schneider, Düsseldorf (DE); Georg Schmidt, Wuppertal (DE)

(73) Assignee: Bayer Pharma Aktiengesellschaft, Berlin (DE)

( * ) Notice: Subject to any disclaimer, the term of this patent is extended or adjusted under 35 U.S.C. 154(b) by 327 days.

(21) Appl. No.: 16/470,521

(22) PCT Filed: Dec. 14, 2017

(86) PCT No.: PCT/EP2017/082867
§ 371 (c)(1),
(2) Date: Jun. 17, 2019

(87) PCT Pub. No.: WO2018/114611
PCT Pub. Date: Jun. 28, 2018

(65) Prior Publication Data
US 2020/0078780 A1 Mar. 12, 2020

(30) Foreign Application Priority Data
Dec. 21, 2016 (DE) ............ 10 2016 015 700.3

(51) Int. Cl.
*B01L 3/00* (2006.01)
*B01L 3/02* (2006.01)
*G01N 21/64* (2006.01)

(52) U.S. Cl.
CPC ............ *B01L 3/0293* (2013.01); *B01L 3/0265* (2013.01); *G01N 21/6452* (2013.01);
(Continued)

(58) Field of Classification Search
CPC ............ B01L 3/0293; B01L 2400/0487; B01L 2300/0838
(Continued)

(56) References Cited

U.S. PATENT DOCUMENTS 4,635,665 A  1/1987 Namba
5,334,352 A * 8/1994 Johnson ............... B01L 3/0293
                                                137/561 A
(Continued)

FOREIGN PATENT DOCUMENTS

DE    202015002179 U1   7/2015
EP        0589632 A1    3/1994
(Continued)

OTHER PUBLICATIONS

BMG Labtech (2011). "The Flagship for High-Throughput Screening," 6 pages.
(Continued)

*Primary Examiner* — Natalia Levkovich
(74) *Attorney, Agent, or Firm* — McBee Moore & Vanik IP, LLC

(57) ABSTRACT

A dispensing device includes a housing having at least one pressure chamber, having a supply opening for the supply of liquid into the pressure chamber and having a multiplicity of conduits between the pressure chamber and an external side of the housing, there being situated in each of the conduits a tube, the first end of which protrudes into the pressure chamber and the second end of which protrudes out of the housing on the external side.

24 Claims, 5 Drawing Sheets

(52) U.S. Cl.
CPC .......... *B01L 2200/0605* (2013.01); *B01L 2300/0829* (2013.01); *B01L 2300/0838* (2013.01); *B01L 2300/0864* (2013.01); *B01L 2400/0487* (2013.01)

(58) Field of Classification Search
USPC .............................................. 422/504–501
See application file for complete search history.

(56) References Cited

U.S. PATENT DOCUMENTS

| | | | |
|---|---|---|---|
| 6,423,536 | B1 | 7/2002 | Jovanovich |
| 7,371,347 | B2 | 5/2008 | Wulf |
| 7,379,832 | B2 | 5/2008 | Zimmermann |
| 2001/0019019 | A1 | 9/2001 | Nordman |
| 2002/0006359 | A1 | 1/2002 | Mathies |
| 2002/0114740 | A1 | 8/2002 | Yamamoto |
| 2004/0018119 | A1* | 1/2004 | Massaro .......... B01L 3/022 422/509 |
| 2004/0071603 | A1 | 4/2004 | Pinkel |

FOREIGN PATENT DOCUMENTS

| | | |
|---|---|---|
| EP | 1099480 A2 | 5/2001 |
| GB | 2353093 A | 2/2001 |
| JP | S55-154476 U | 4/1979 |
| JP | S56-65461 U | 10/1979 |
| JP | S60-7340 A | 1/1985 |
| JP | H6-219500 A | 8/1994 |
| JP | 2003-507715 A | 2/2003 |
| WO | 0113128 A | 2/2001 |
| WO | WO03072258 | 9/2003 |

OTHER PUBLICATIONS

Dickson, P.N. et al. (1986). "Extension of Accessible First-Order Rate Constants and Accurate Dead-Time Determinations for Stopped-Flow Spectroscopy," Anal. Chem. 58: 3153-3158.

Gonzalez, J.E. et al. (2002), "Cellular Fluorescent Indicators and Voltage/Ion Probe REader (VIPRtm): Tools for Ion Channel and Receptor Drug Discovery," Receptors and Channels 8:283-295.

Hamamatsu (2014). "Functional Drug Screening System," 4 pages.

International Search Report and Written Opinion dated Feb. 6, 2018 for PCT Patent Application No. PCT/EP2017/082867 filed on Dec. 14, 2017, 11 pages.

Molecular Devices (2010). "FLIPRTETRA System: Real-Time Kinetic Cellular Assays," 12 pages.

Mori, T. et al. (2009). "Use of a Real-Time Fluorescence Monitoring System for High-Throughput Screening for Prolyl Isomerase Inhibitors," Journal of Biomolecular Screening 14(4):419-424.

Nakatani, H. et al. (1980). "Analysis of Signal Amplitude in Stopped-Flow Method for Enzyme-Ligand Systems," J. Biochem, 87:1805-1810.

Peterman, B.F. (1979). "Measurement of the Dead Time of a Fluorescence Stopped-Flow Instrument," Analytical Biochemistry 93:442-444.

Ramachandra Shastry, M.C. et al., (1998). "A Continuous-Flow Capillary Mixing Method to Monitor Reactions on the Microsecond Time Scale," Biophysical Journal 74:2714-2721.

Regenfuss, P. et al., (1985). "Mixing Liquids in Microseconds," Rev. Sci. Instrum. 56:283-290.

Roder, H. et al. (2004). "Rapid Mixing Methods for exploring the Kinetics of Protein Folding," Methods 34:15-27.

Schroeder, K.S. et al. (1996). "FLIPR: A New Instrument for Accurate, High Throughput Optical Screening," Journal of Biomolecular Screening, 1(2):75-80.

Thermo Scientific (2011). "Thermo Scientific Multidrop 384 and Multidrop DW." 2 pages.

Thermo Scientific (2011). "Thermo Scientific Multidrop Combi nL Reagent Dispenser." 4 pages.

Thermo Scientific (2011). "Thermo Scientific Multidrop Combi Reagent Dispenser," 4 pages.

Thermo Scientific (2011). "Thermo Scientific Multidrop Dispensing Cassettes," 2 pages.

Thermo Scientific (2019) "Thermo Scientific Luminoskan Ascent," 2 pages.

* cited by examiner

Section A-A

Detail A

METERING DEVICE

CROSS-REFERENCE TO RELATED APPLICATIONS

This application is the national stage of International Application No. PCT/EP2017/082867, filed internationally on Dec. 14, 2017, which claims the benefit of German Application No. 10 2016 015 700.3, filed Dec. 21, 2016.

FIELD OF THE INVENTION

The invention relates to a dispensing device and a dispensing system for the parallel delivery of liquids into the wells of a microtiter plate.

BACKGROUND OF THE INVENTION

The aim of the identification and development of novel drug substances is to identify chemical compounds which modulate biochemical processes, such as ligand binding, macromolecular conformational changes or enzymatic reactions. Use is usually made of high-throughput screening (HTS) for assaying a large number of chemical structures, since the miniaturization ensures a rapid, cost-effective and efficient assay.

Owing to their high sensitivity and automatability, fluorescence-based assays are probably the most important approaches for HTS. In addition to tracking the change in fluorescence due to an enzymatic reaction, use is made of labeling techniques for determining protein-protein interactions or ligand binding by fluorescence resonance energy transfer (FRET), bioluminescence resonance energy transfer (BRET) or fluorescence polarization (FP).

Many biological processes, especially the binding of small ligands, are characterized by very rapid kinetics, which require rapid mixing methods.

However, instruments using plate formats with 384 or 1536 assay wells are often limited with respect to time-resolution, and as a result, the determination of rapid binding kinetics is restricted to methods with low throughput. Even the screening approach of instruments equipped with a multidispenser (see Gonzalez, J. E., and Maher, M. P. (2002) Cellular Fluorescent Indicators and Voltage/Ion Probe Reader (VIPR™): Tools for Ion Channel and Receptor Drug Discovery, *Receptors and Channels* 8, 283-295; Mori, T., Itami, S., Yanagi, T., Tatara, Y., Takamiya, M., and Uchida, T. (2009) Use of a Real-Time Fluorescence Monitoring System for High-Throughput Screening for Prolyl Isomerase Inhibitors, *Journal of Biomolecular Screening* 14, 419-424; Schroeder, K. S., and Neagle, B. D. (1996) FLIPR: A New Instrument for Accurate, High Throughput Optical Screening, *Journal of Biomolecular Screening* 1, 75-80.), this considerably improving time-resolution, is mainly restricted to the seconds time range.

Rapid mixing methods known from the prior art are continuous-flow or stopped-flow devices.

In the case of continuous-flow experiments, the reaction is analyzed under equilibrium flow conditions as a function of the path downstream of the mixer. Improvements in mixer design led to dead times within the range of 100 s or even shorter (Regenfuss, P., Clegg, R. M., Fulwyler, M. J., Barrantes, F. J., and Jovin, T. M. (1985) Mixing liquids in microseconds, *Rev. Sci. Instrum.* 56, 293-290; Shastry, M. C. R., Luck, S. D., and Roder, H. (1998) A Continuous-Flow Capillary Mixing Method to Monitor Reactions on the Microsecond Time Scale, *Biophysical Journal* 74, 2714-2721; Roder, H., Maki, K., Cheng, H., and Ramachandra Shastry, M. C. (2004) Rapid mixing methods for exploring the kinetics of protein folding, *Methods* 34, 15-27.). However, high flow rates and relatively large channel dimensions are necessary to achieve efficient mixing, and this uses up large amounts of material.

In the case of commercially available stopped-flow instruments, the reactants are supplied via two syringes with the aid of a pneumatic actuator. After the observation cell has been filled, the flow is abruptly stopped when the stop syringe hits a stop block. Instruments can routinely achieve dead times of a few milliseconds (Dickson, P. N., and Margerum, D. W. (1986) Extension of accessible first-order rate constants and accurate dead-time determinations for stopped-flow spectroscopy, *Analytical Chemistry* 58, 3153-3158; Nakatani, H., and Hiromi, K. (1980) Analysis of Signal Amplitude in Stopped-Flow Method for Enzyme-Ligand Systems, *Journal of Biochemistry* 87, 1805-1810; Peterman, B. F. (1979) Measurement of the dead time of a fluorescence stopped-flow instrument, *Analytical Biochemistry* 93, 442-444).

Both continuous-flow and stopped-flow instruments are methods with low throughput that is restricted to one cuvette or one channel A rapid mixing method for assaying multiple inhibitors and concentrations is, however, necessary, since the determination of rapid binding reactions or enzyme kinetics plays a fundamental role in the identification and development of novel drug substances. To be able to observe rapid kinetics in microtiter plates, a new imaging instrument for the detection of rapid kinetics was developed that combines high time-resolution with the throughput of a highly parallelized system. This allows, for the first time, the efficient application of rapid kinetics to the identification and development of novel drug substances.

An important component of the new instrument is a dispensing device for the parallel delivery of liquids into the wells of a microtiter plate. Such dispensing devices are known from the prior art.

EP 1 099 480 A2 discloses a microdispensing device in which each individual dispensing capillary has its own microvalve assigned thereto. Said microdispensing device has the disadvantage that each individual valve requires its own supply line and such a valve arrangement does not allow parallel dispensing into 48 wells of a microtiter plate owing to the individual valve diameters.

In the case of the dispensing device known from DE 199 11 456 A1, liquid delivery is controlled via a dispenser which comprises solenoid valves in conjunction with a pressure vessel or rotating plunger pumps. The liquid is delivered via a main liquid channel which is connected to a liquid reservoir and branches multiple times up to the desired number of outlets.

DE 102 36 029 A1 discloses a linear dispenser comb structured symmetrically in an arboreal manner, which comb is connected to a controllable pump for dispensing the amount of liquid to be dispensed.

DE 102 55 595 A1 discloses a multi-channel dispensing device comprising multiple dispensing channels, in which a microvalve is assigned to each outlet nozzle for liquid. The microvalves comprise at least one supply opening which is, in each case, connected to an exit of a manifold, the entrance of which is connected to a liquid reservoir via a flow sensor. The flow sensor is used for calibration in order to compensate for tolerances of the dispensing channels among one another.

The disadvantages of these known dispensing devices are the large capillary lengths and, depending on the construction, different capillary radii, which lead to a pressure loss which is high and additionally different for each capillary and thus to differing dispensing volume.

SUMMARY OF THE INVENTION

The dispensing device according to some embodiments of the invention comprises a housing having at least one pressure chamber, having a supply opening for the supply of liquid into the pressure chamber and having a multiplicity of conduits between the pressure chamber and an external side of the housing, there being situated in each of the conduits a tube, the first end of which protrudes into the pressure chamber and the second end of which protrudes out of the housing on the external side.

The pressure chamber preferably has a larger extent in one spatial dimension than in the other two spatial dimensions. The longitudinal axis of the pressure chamber runs in the direction of the larger extent. The longitudinal axis of the pressure chamber simultaneously runs in parallel to the external side of the housing. In a preferred embodiment, the pressure chamber is cylindrical or cuboid.

The conduits can be situated in one of the walls of the pressure chamber, which run in parallel to the longitudinal axis of the pressure chamber. Preferably, the conduits are arranged in parallel to one another. At least two conduits are present. The conduits can be arranged in one or more rows in parallel to the longitudinal axis of the pressure chamber. In this connection, there are preferably 12, particularly preferably 24 or 48, conduits per row. Ideally, the number of conduits per row is matched with the number of wells in a row of the microtiter plate (long side) into which dispensing is carried out by the dispensing device.

The tubes are preferably capillaries made of metal or plastic, capillaries, i.e. thin tubes, in which the capillarity effect occurs with the liquids used. They should can have an inner diameter within the range from 0.1 mm to 0.8 mm, preferably 0.2 mm to 0.6 mm. The outer diameter can be within the range from 0.35 mm to 2 mm, preferably 0.6 mm to 1.1 mm. The length of the tubes is within the range from 6 mm to 15 mm, preferably 8.5 mm to 13 mm, particularly preferably 10 mm to 13 mm.

The tubes can be arranged such that they are perpendicular (90°) to the external side of the housing or are inclined at an angle to the external side of the housing within the range from 40° to <90°, depending on whether liquid is to be delivered into the well of the microtiter plate in a perpendicular manner from above, or is to be delivered or injected onto the side wall of the well at an angle.

To increase the hydrophobicity of the tubes which Drell can be situated on the external side of the housing, they can be sheathed, preferably with plastic, for example Teflon.

In one embodiment, the supply opening for the liquid is situated in one of the walls arranged perpendicularly to the longitudinal axis of the pressure chamber. The housing can furthermore comprise a vent opening, out of which air is forced during filling of the pressure chamber with liquid. Said vent opening can be situated in one of the walls arranged perpendicularly to the longitudinal axis of the pressure chamber.

The pressure chamber can have a cross-sectional area within the range from 60 $mm^2$ to 300 $mm^2$ or a diameter within the range from 4 mm to 10 mm, preferably within the range from 5.5 mm to 6.5 mm.

The housing of the dispensing device can also comprise more than one pressure chamber, for example two, three or four pressure chambers, the longitudinal axes of which run in parallel to one another. Belonging to each pressure chamber is a separate supply opening for the supply of liquid into the pressure chamber, and each pressure chamber is connected to a multiplicity of conduits (having the corresponding tubes) between the pressure chamber and the external side of the housing. Preferably, the conduits and tubes of the various pressure chambers are arranged in parallel to one another. If necessary, it is also possible for multiple housings having one or more pressure chambers to be arranged next to one another and in parallel to one another.

According to some embodiments, the invention further provides a dispensing system comprising the above-described dispensing device and a liquid reservoir which is connected to the supply opening of the dispensing device via a line. Pressure on the liquid reservoir brings about the pumping of liquid from the liquid reservoir into the pressure chamber. To this end, the liquid reservoir is closed off from the surrounding atmosphere in a pressure-tight manner and connected to a pump which builds up the necessary pressure. In the case of multiple pressure chambers, the supply opening of each pressure chamber can be connected to the same reservoir of liquid or various reservoirs of liquid.

Via the switching time of the valve between liquid reservoir and supply opening in combination with the pressure of the pump, it is possible to control the amount of liquid which gets into the pressure chamber in each switching cycle (conduit open/closed) and is outputted via the individual tubes.

In one embodiment of the invention, the liquid from the liquid reservoir rests against the valve under a pressure within the range from 0.5 to 2 bar, preferably within the range from 0.5 to 0.85 bar, and the valve has a switching time within the range from 5 ms to 200 ms (5-60 ms in the case of microtiter plates with 1536 wells, 40-200 ms in the case of microtiter plates with 384 wells), preferably within the range from 5 ms to 50 ms.

The switching time of the valve and the pressure due to the pump can be adjusted such that the delivery volume of the dispensing device is within the range 0.3 and 300 µl per capillary, preferably between 1 and 30 µl.

The advantage of the dispensing device according to some embodiments of the invention, or the dispensing system, is that, owing to the large volume of the pressure chamber combined with the short tubes protruding into the pressure chamber, there is no pressure gradient and a very rapid and quantitatively accurate delivery of liquid is thus possible. A parallel, precise and rapid dispensing in the µl range into, for example, 384-well or 1536-well microtiter plates is made possible as a result.

BRIEF DESCRIPTION OF THE DRAWINGS

The invention will now be explained in reference to the enclosed drawings, which show advantageous example embodiments.

DETAILED DESCRIPTION OF THE INVENTION

Figure 1:
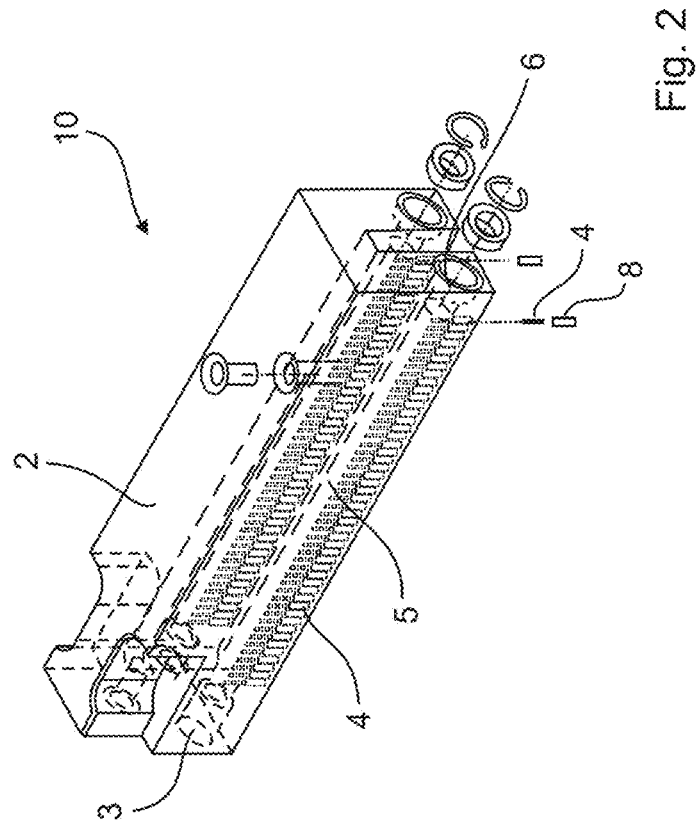
FIG. 1 is a perspective view of two dispensing devices with two pressure chambers.
Figure 2:
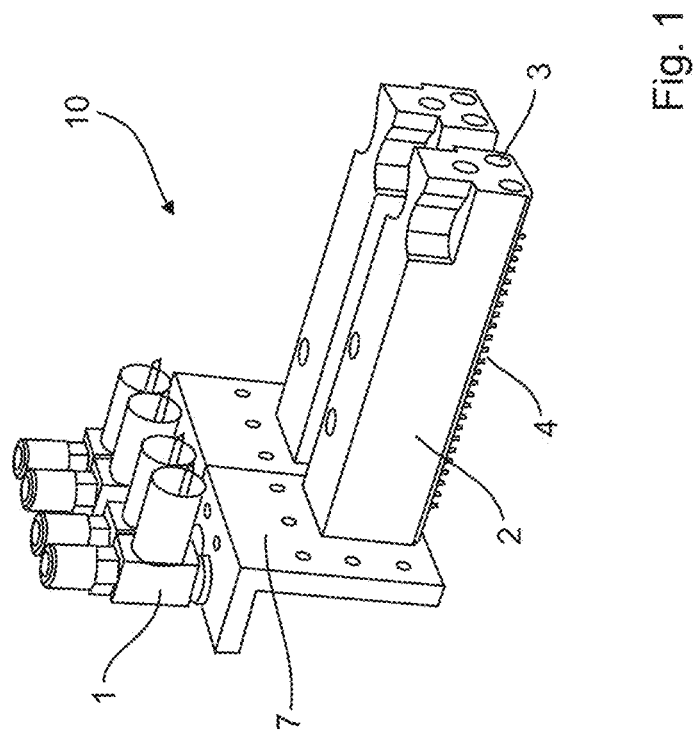
FIG. 2 is a perspective view of the inner structure of the dispensing device with two pressure chambers.

FIG. 1 shows two parallelly arranged dispensing devices 10 according to an embodiment of the invention, each with two pressure chambers, in perspective view. Further views of a dispensing device are shown in FIGS. 2 to 5. Each dispensing device 10 has a cuboid housing 2 with two tubular bores of 4-10 mm diameter and 120-140 mm length. Said bores form two parallel pressure chambers 5. Each bore has an open end which forms the circular supply opening 6. The opposite end is opened for system filling and emptying and is sealed tight during dispensing operation. Situated here is the leakage or vent opening 3. The side of the housings 2 on which the supply opening 6 is situated is attached to a mount 7 such that said housings protrude away from the mount 7 in a horizontal manner. The mount 7 has a recess for each supply opening 6. Situated on the underside of the outwardly protruding housing 2 is a row of up to 48 conduits between each pressure chamber 5 and the underside of the housing 2, there being situated in each of the conduits a capillary tube 4 made of preferably stainless steel, the first end of which protrudes into the pressure chamber 5 and the second end of which protrudes out of the housing 2 on the underside. The capillary tubes have an inner diameter of 0.1-0.8 mm and are arranged perpendicularly. The segments of the tubes protruding out of the underside of the housing 2 are hydrophobically sheathed (preferably with Teflon).

Figure 3:
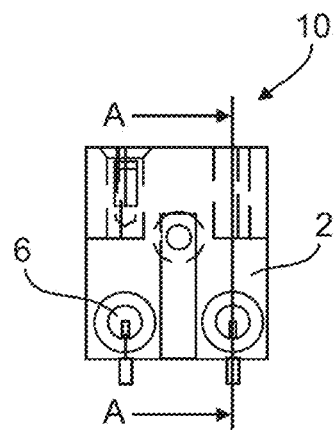
FIG. 3 is a rear view of the dispensing device with two pressure chambers.

FIG. 3 shows the dispensing device 10 in rear view with a view of the two supply openings 6.

Figure 4:
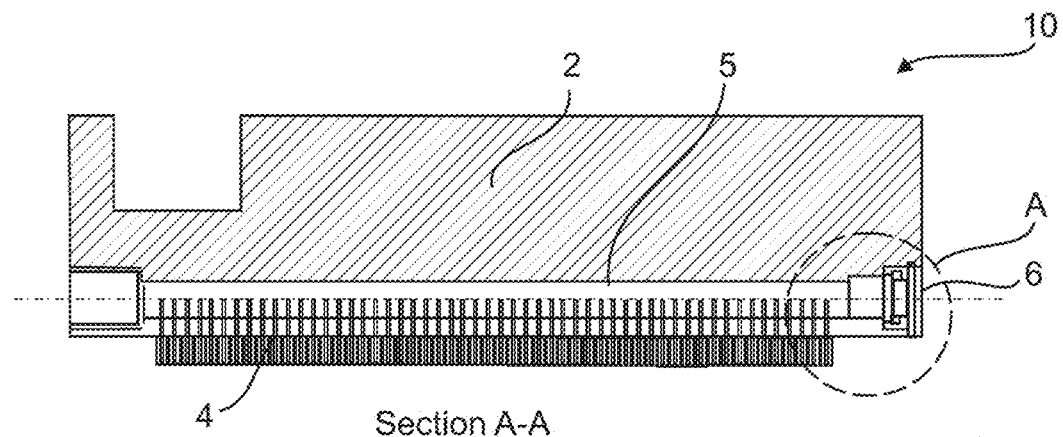
FIG. 4 is a side view of the dispensing device.
Figure 5:
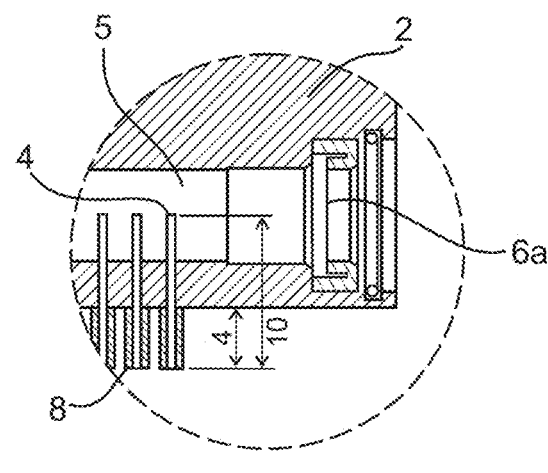
FIG. 5 is a side view (valve-side) of an enlarged section of the dispensing device.

FIG. 4 shows the dispensing device 10 in side view. The circular section A is shown enlarged in FIG. 4. In FIG. 4, it can be seen that the capillary tubes 4 protrude into the pressure chamber up to half the height thereof. This has been found to be particularly advantageous for a uniform dispensing for all 48 capillaries.

Figure 6:
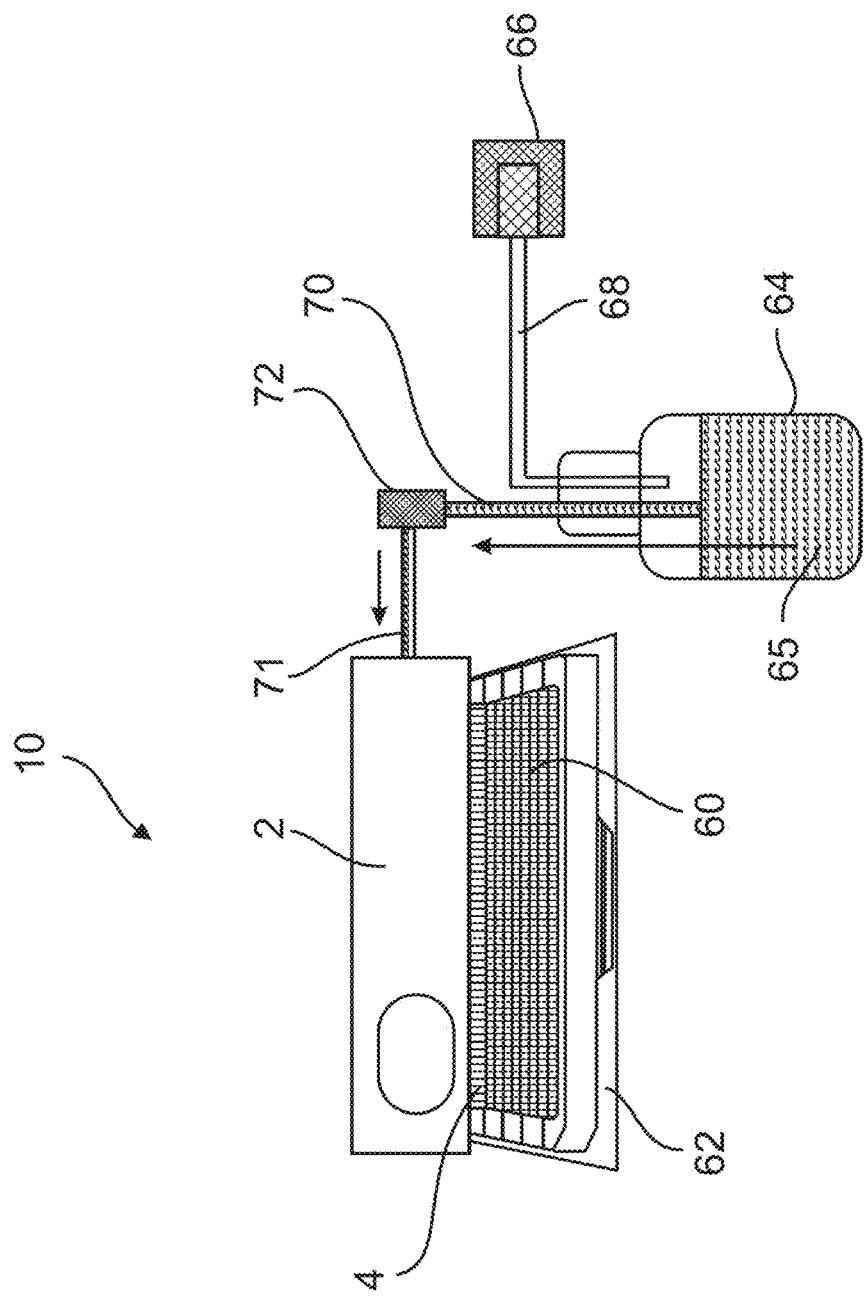
FIG. 6 shows the dispensing system with liquid reservoir.

FIG. 6 shows the dispensing system according to an embodiment of the invention. The pressure chamber 5 (not visible in the housing 2) of the dispensing device 10 is connected, via a line 71, a valve 72 and a further line 70, to a liquid situated in a reservoir vessel. Via a membrane pump 66 and a pressure line 68, room air is introduced into the reservoir vessel under a pressure of 0.8 bar. It is also possible to use a different gas such as $N_2$ instead of room air. It is also possible to use a different pressure supply system instead of the membrane pump. Solenoid valves with low dead-space volume and short switching time, as sold by Parker Hannifin Corp., Cleveland, Ohio 44124 USA, for example, have been found to be suitable valves.

Hereinafter, the operation of an imaging measurement instrument having the dispensing device according to some embodiments of the invention will be described.

The liquid 65 containing the reactant to be analyzed is pumped into the pressure chamber 5 (not visible) of the dispensing device via a valve 72 from a reservoir vessel 64 (FIG. 6). The capillary tubes 4 have an outer diameter (including the sheath) of less than 2 mm, this allowing a parallel dispensing into 48 assay wells of the microtiter plate (FIG. 6). To achieve mixing conditions of high turbulence, the orientation of the dispensing outlets of the tubes 4 is specifically adapted to microtiter plates with 384 and 1536 assay wells. According to some embodiments, best mixing results for microtiter plates with 384 assay wells were achieved by dispensing the reactant in a diagonal manner onto the microtiter plate wall. In contrast, the lower dispensing volume necessary for microtiter plates 60 with 1536 assay wells is dispensed perpendicularly, as shown in FIG. 6. Typical dispensing times for the required reactant volumes were determined by weighting of the dispensed liquid with a known time of switching of the valve 72 at a pressure of 0.8 bar.

A precise microtiter plate mount 62 can ensure the exact orientation of the dispensing device 10 in relation to the wells of the microtiter plate 60.

The progress of a reaction can be tracked by the simultaneous recording of the fluorescence intensity of all 48 assay wells in a row or of all assay wells of the microtiter plate. Dispensing from the upper side of the microtiter plate 60 situated on a microtiter plate mount 62 is combined with illumination and detection from the underside. This allows the observation of the kinetic process during the dispensing time and mixing time.

Figure 8:
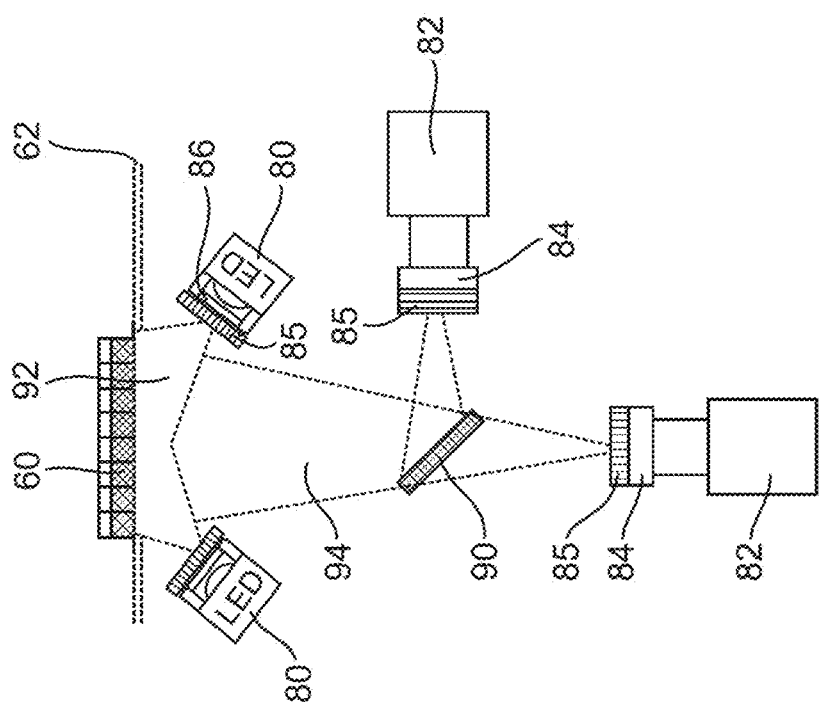
FIG. 8 shows the imaging measurement instrument (two-channel detection)
Figure 7:
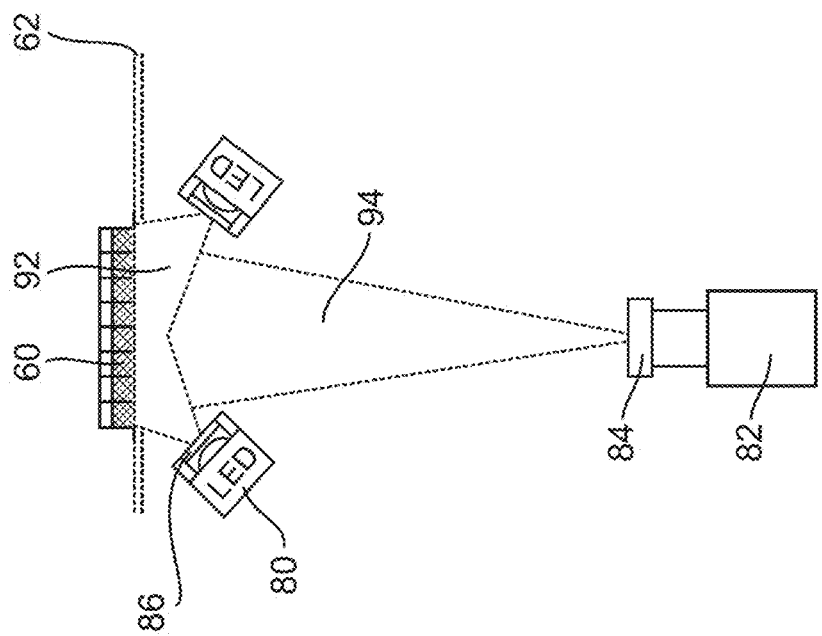
FIG. 7 shows the imaging measurement instrument (one-channel detection)

According to some embodiments, the homogeneous illumination of the base of the microtiter plate 60 can be achieved by 2 LED illumination units with in each case up to 36 UV or VIS high-output LEDs 80 which can be arranged in rows and oriented diagonally in relation to the plate (FIGS. 7 and 8). The LEDs 80 available supply light 92 within the wavelength range from 340 to 800 nm and extinction filters improve the fluorescence excitation by transmitting a selected wavelength range. The emitted fluorescence 94 is detected perpendicularly and/or at an angle of 90° by a rapid and highly sensitive back-illuminated EMCCD (electron multiplying charge coupled device) or ICCD (intensified charge coupled device) camera 82. The cameras 82 are equipped with interference filters 84 and can additionally be equipped with polarization filters 85.

The expansion of the adjustable camera structure to dual fluorescence detection (FIG. 8) allows the simultaneous detection of two emission signals, as necessary, for example, in measurements in relation to Förster resonance energy transfer (FRET), bioluminescence resonance energy transfer (BRET) or in relation to fluorescence polarization (FP).

According to some embodiments, it is possible to expand the measurement system shown in FIGS. 7 and 8 by further LED illumination units, which are arranged beneath the LED units shown at an altered illumination angle. If these additional LED units have a different wavelength compared to the original LED units, it is possible to effect a fluorescence excitation in multiple wavelengths.

The false-color depiction of the emission of a microtiter plate with 1536 assay wells containing fluorescent solution is depicted by way of example in FIG. 13. Data for the assay wells are collected by capturing and visualizing up to 1000 points per second per assay well and processing them by means of customized data processing software.

Performance Test

A method routinely used to test the performance of a rapid mixing device is the observance of a rapid test reaction. In the case of fluorescence studies, what is suitably tracked is the binding of the hydrophobic dye 1-anilino-8-naphthalenesulfonic acid (ANS) to bovine serum albumin (BSA), which is associated with a large increase in fluorescence yield. The fluorescence kinetics for various BSA concentrations are fitted to exponential functions and extrapolated to a common starting fluorescence. This common point provides the fluorescence of ANS in the absence of BSA at the starting time point (to) of the reaction. The time interval from this point up to the first data point which falls onto the fitted exponential curve provides an estimate of the dead time of the measurement. FIGS. 14 A-C show the corrected fluorescence kinetics at various BSA concentrations, which were measured in the imaging measurement instrument with the inventive dispensing device for rapid kinetics.

Figure 10A:
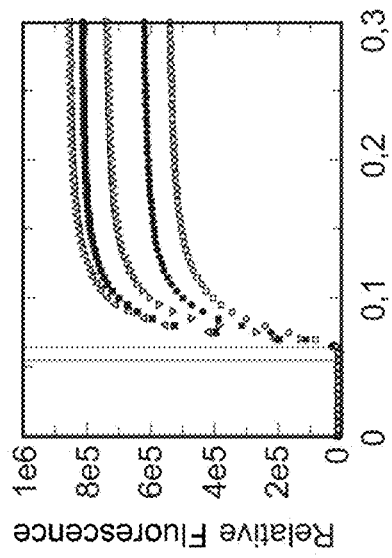
FIG. 10 A-C show the measurement of the kinetics of the binding of ANS to BSA using the imaging measurement instrument.

After 55 ms, 1.6 µl of ANS solution were added via capillary valve switching of 9 ms to 48 assay wells of a BSA-containing microtiter plate (FIG. 10A). The capillary valve switching is indicated by the gray bar. The binding of ANS to BSA leads to an increase in ANS fluorescence, which is recorded at 460 nm (bandpass 60 nm) after excitation at 370 nm (bandpass 36 nm). The ANS and BSA solutions were prepared in 100 mM potassium phosphate (pH 7.5). Final concentration: 5 µM ANS and 1.9 (open circles), 2.5 (filled circles), 3.4 (inverted triangles), 7.9 (squares) and 10.6 µM (triangles) BSA (FIG. 10A).

Figure 10C:
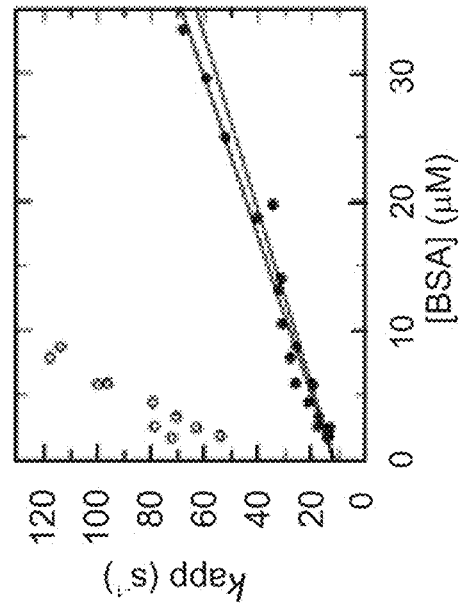
Figure 9:
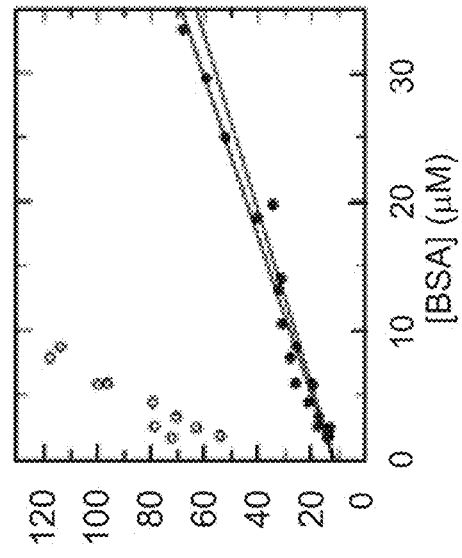
FIG. 9 shows the false-color image of the emission of a microtiter plate with 1536 assay wells.
Figure 10B:
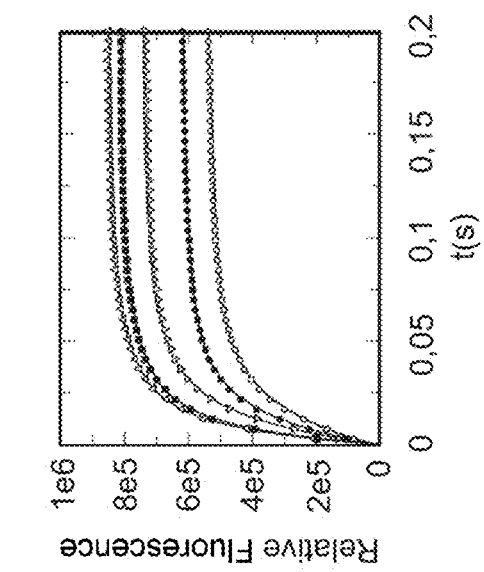

The starting time point of the binding reaction was ascertained by double exponential fits and extrapolation of the fluorescence kinetics to the common start time to. The fluorescence kinetics (gathered from FIG. 10A) were corrected to said start time to (FIG. 10B). Solid lines show double exponential functions which were extrapolated to the common time point to.

It should be noted that to of the reaction is not equivalent to the time point of valve switching, but instead has a time delay corresponding to the entry and the mixing of the reactants in the assay wells. The dead time of the instrument, which is implemented by the period from to up to the first correctly determined point on the fitted exponential curve, is based on the dispensing time and mixing artifacts. In the case of the presence of 3 µl of liquid in the assay wells of a microtiter plate and dispensing of a small volume of 1.6 µl into the 1536 assay wells of said microtiter plates, it is possible to achieve a dead time of about 10 ms, which approximately corresponds to the time-resolution of commercial stopped-flow instruments of a few milliseconds.

The detected fluorescence traces (FIG. 10B) show a very low noise level, which according to some embodiments indicates the high quality of the kinetics data. FIG. 10C shows a graph of the apparent rate constants of binding, ascertained from the kinetics traces, as a function of the BSA concentration. It was possible to detect a slow (filled circles) binding phase and a rapid binding phase (open circles). The linear dependency of the binding phase with slow kinetics on the BSA concentration can confirm the accuracy and reliability of the determined traces. The observed rate constants (black) were compared with data which were obtained by means of a conventional stopped-flow apparatus (red). According to some embodiments, the apparent rate constants and the second-order rate constants, which were determined on the basis of the concentration-dependence of the slow binding phase, coincide outstandingly with the data which were obtained via addition in a stopped-flow apparatus in an individual cuvette.

REFERENCE NUMBERS

10 Dispensing device
1 Valve
2 Housing
3 Leakage/vent opening
4 Tube
5 Pressure chamber
6 Supply opening
6a Seal
7 Mount
8 Sheath
60 Microtiter plate
62 Plate holder
64 Reservoir vessel
65 Liquid
66 Pump
68 Pressure line
70 Line
71 Line
72 Valve
80 LED module
82 Camera
84 Emission filter
85 Polarization filter
86 Excitation filter
90 Beam splitter
92 Excitation light
94 Fluorescence light

The invention claimed is:

1. A dispensing device comprising:
a housing comprising at least one chamber,
a supply opening configured to supply liquid into the chamber,
a multiplicity of conduits located between the chamber and the housing, wherein each of the conduits comprises a tube, a first end of the tube protrudes into the chamber and a second end of the tube protrudes out of the housing, and
a lockable vent opening;
wherein the housing surrounds the at least one chamber,
wherein the chamber is cylindrical and is larger in one spatial dimension than in the other two spatial dimensions, and a longitudinal axis of the chamber runs in the direction of the larger dimension, the chamber surrounded by a first wall of the housing arranged parallel to the longitudinal axis of the chamber, the first wall defining an inner diameter of the chamber,
the supply opening is an opening situated in a second wall of the housing arranged perpendicularly to the longitudinal axis of the chamber, the first wall defining an inner diameter of the supply opening, and
the lockable vent opening is an opening situated in a third wall of the housing arranged perpendicularly to the longitudinal axis of the chamber, wherein the third wall is located opposite to the second wall.

2. The dispensing device of claim 1, wherein the conduits are situated in the first wall, and the conduits are arranged in parallel to one another.

3. The dispensing device of claim 2, wherein the conduits are arranged in one or more rows in parallel to the longitudinal axis of the chamber.

4. The dispensing device of claim 1, wherein the tube is a capillary.

5. The dispensing device of claim 1, wherein the tube is arranged such that the tube either is substantially perpendicular (90°) to the first wall of the housing or is inclined at an angle to the first wall of the housing from 40° to less than 90°.

6. The dispensing device of claim 1, wherein the second end of the tube that protrudes out of the housing is sheathed by a sleeve.

7. The dispensing device of claim 1, wherein the housing comprises two to four chambers, the longitudinal axes of the chambers run in parallel, and each chamber comprises a separate supply opening for supplying liquid.

8. A dispensing system comprising:
a housing comprising a chamber,
a supply opening configured to supply liquid into the chamber,
a multiplicity of conduits located between the chamber and the housing, wherein each of the conduits comprises a tube, a first end of the tube protrudes into the chamber and a second end of the tube protrudes out of the housing, and
a lockable vent opening;
wherein the housing surrounds the at least one chamber,
wherein the chamber is cylindrical and is larger in one spatial dimension than in the other two spatial dimensions, and a longitudinal axis of the chamber runs in the direction of the larger dimension, the chamber surrounded by a first wall of the housing arranged parallel to the longitudinal axis of the chamber, the first wall defining an inner diameter of the chamber,
the supply opening is an opening situated in a second wall of the housing arranged perpendicularly to the longitudinal axis of the chamber, the first wall defining an inner diameter of the supply opening, and
the lockable vent opening is an opening situated in a third wall of the housing arranged perpendicularly to the longitudinal axis of the chamber, wherein the third wall is located opposite to the second wall, and
a liquid reservoir which is connected to the supply opening via a supply line.

9. The dispensing system of claim 8, wherein a valve is situated between the liquid reservoir and the supply opening.

10. The dispensing system of claim 9, wherein the dispensing system further comprises a membrane pump connected to the liquid reservoir via a pressure line.

11. The dispensing system of claim 10, wherein the membrane pump is configured to provide pressure in a range from 0.5 to 0.85 bar.

12. The dispensing system of claim 10, wherein the valve has a switching range from 5 ms to 50 ms.

13. The dispensing device of claim 1, wherein the supply opening is configured to receive an adapter, the adapter is configured to receive a supply line, and the supply line is configured to provide fluid communication between the chamber and a liquid reservior.

14. The dispensing device of claim 13, wherein the supply line has an inner diameter less than the inner diameter of the supply opening and equal to the inner diameter of the chamber.

15. The dispensing device of claim 1, wherein the housing is attachable to a mount.

16. The dispensing device of claim 15, wherein the second wall is attachable to the mount, the supply opening facing the mount.

17. The dispensing device of claim 16, wherein the mount comprises a recess adjacent the supply opening.

18. The dispensing device of claim 15, further comprising the mount.

19. The dispensing device of claim 1, wherein the dispensing device further comprises a valve configured to control flow of liquid to the supply opening through a line.

20. The dispensing device of claim 19, wherein the valve and the housing are attachable to a mount.

21. The dispensing device of claim 20, wherein the mount comprises first and second extensions, the first extension positioned perpendicular to the second extension, the first and second extension forming a recess, the valve attachable to the first extension, and the second wall attachable to the second extension with the supply opening adjacent the recess.

22. The dispensing device of claim 20, further comprising the mount.

23. The dispensing device of claim 1, wherein the lockable vent is configured for passage of air from the chamber during introduction of liquid into the chamber.

24. The dispensing system of claim 8, wherein the lockable vent is configured for passage of air from the chamber during introduction of liquid into the chamber.

* * * * *